May 22, 1951   J. H. BOOTH   2,553,743
BALL JOINT
Filed Sept. 13, 1946
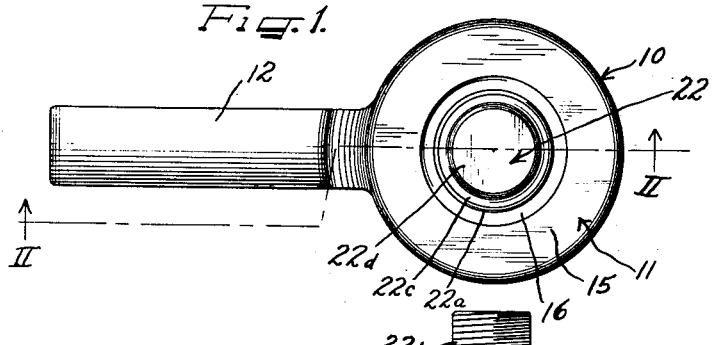
Fig. 1.
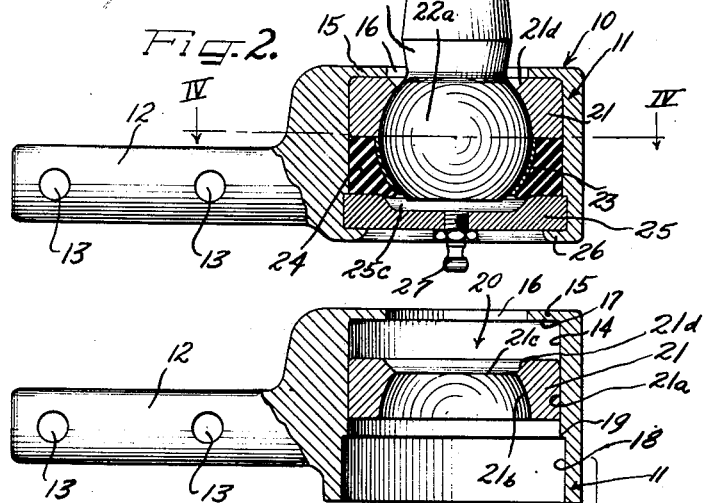
Fig. 2.
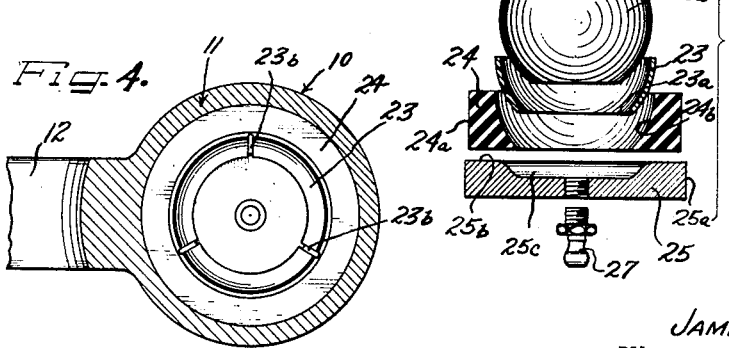
Fig. 3.
Fig. 4.
INVENTOR.
JAMES H. BOOTH
BY
ATTYS Patented May 22, 1951

2,553,743

UNITED STATES PATENT OFFICE 2,553,743

BALL JOINT

James H. Booth, Detroit, Mich., assignor to Thompson Products, Inc., Cleveland, Ohio, a corporation of Ohio Application September 13, 1946, Serial No. 696,822

6 Claims. (Cl. 287—90)

This invention relates to joints accommodating limited universal movements, and having automatic wear take-up features without requiring heretofore-necessary wear take-up springs.

Specifically, the invention deals with a ball and socket joint having a hardened steel bearing ring partially encompassing the ball end of a stud, and a compressively loaded resilient ring holding a plastic or metal fragmental spherical shaped collar around an adjacent part of the ball end of the stud to coact with the steel ring in providing a ball socket.

According to this invention, a housing or casing is provided with a cylindrical chamber having an apertured end wall at one end thereof providing a first shoulder and a counterbore in the other end thereof providing a second shoulder. The housing or casing has a laterally extending stem or shank adapted for mounting in a bracket such as, for example, the bracket on the wheel suspension arm of an automobile front wheel assembly. A hardened steel bearing ring is seated in the chamber against the first shoulder. This ring has an inner wall of fragmental spherical contour converging into alignment with the aperture in the end wall of the housing. A rubber ring is seated in the chamber against the steel ring and has a fragmental spherical inner wall carrying a collar or liner which coacts with the inner wall of the steel ring to provide a ball seat. A ball stud has the ball end thereof tiltable and rotatable on said ball seat, and has a shank extending freely through the aperture in the end wall of the housing. A closure plug is seated in the counterbore against the second shoulder and the housing is spun under the peripheral margin of the closure plug to secure the plug in the housing. The plug compressively loads the rubber ring and partially deforms the ring into a central recess provided in the plug. The ball can project into this recess. A lubricant fitting on the plug is provided to furnish lubricant to the recess for lubricating the bearing surfaces of the ball end and ball seat. The loaded rubber ring, preferably composed of oil-resistant synthetic rubber, takes the place of the heretofore-necessary wear take-up spring, and is effective to expand for urging its liner into constant bearing engagement with the ball end of the stud, and to also urge the ball end of the stud toward the convergent end of the inner wall of the hardened steel ring.

It is, then, an object of this invention to provide a universal-type joint wherein a steel ring and a lined rubber ring coact to define a socket, and wherein the rubber ring is compressively loaded to impart wear take-up properties to the socket.

Another object of the invention is to provide a ball and socket joint wherein a hardened steel ring and a plastic lined rubber ring coact to define a ball socket, and wherein a housing closure plug compressively loads the rubber ring to cause it to function as a wear take-up means.

A still further object of the invention is to provide an inexpensive ball and socket type joint for wheel suspensions and the like and having a compressively loaded rubber ring taking the place of the heretofore-used wear take-up spring without sacrificing wear take-up properties.

A further object of the invention is to provide a springless ball and socket joint having a hardened steel ball seat and a plastic complementary ball seat, together with a compressively loaded resilient bushing member maintaining the seat in good bearing engagement with the ball stud.

Other and further objects of the invention will be apparent to those skilled in the art from the following detailed description of the annexed sheet of drawings which, by way of a preferred example only, illustrates one embodiment of the invention.

On the drawings:

Figure 1 is a plan view of a ball and socket joint according to this invention.

Figure 2 is a longitudinal cross-sectional view taken along the line II—II of Figure 1.

Figure 3 is a view similar to Figure 2 but illustrating the joint parts in separated or exploded relationship to show the manner in which the parts are assembled.

Figure 4 is a horizontal cross-sectional view, with the ball stud omitted, taken along the line IV—IV of Figure 2.

As shown on the drawings:

In Figures 1, 2, and 4, the reference numeral 10 designates generally a ball and socket joint for a wheel suspension arm. The joint 10 includes a cylindrical housing or casing 11 having a laterally extending mounting shank or stem 12. Bolt holes 13 are formed through the shank or stem 12 to anchor the housing in the mounting bracket or the like of a wheel suspension arm.

As best shown in Figure 3, the cylindrical housing 11 has a cylindrical bore 14 therethrough terminating at one end in an apertured end wall 15 having a central aperture 16 therein. The end wall 15 provides a shoulder 17 at one end of the bore 14. The other end of the bore 14 is counterbored at 18 and a second shoulder 19 is provided. The housing thus has a cylindrical chamber 20 bounded at one end by a first shoulder 17 and at the other end by a second shoulder 19.

A hardened steel bearing ring 21, having a cylindrical periphery 21a sized for fitting in the bore 14 is bottomed in the chamber 20 against the first shoulder 17. If desired, the hardened steel ring 21 may be press-fitted in the bore 14. The ring 21 has a fragmental spherical inner wall 21b converging to an opening 21c. A beveled mouth 21d is provided around the opening 21c. As shown in Figure 2, the mouth 21d flares outwardly to the rim of the aperture 16 in the end wall 15 so that the bearing ring 21 will not interfere with free tilting movements of the stud member 22 of the joint.

The stud 22 has a ball end 22a disposed in the chamber 20 of the casing 11, a neck portion 22b extending through the aperture 16 of the casing, a tapered portion 22c outside of the casing for mounting in the eye end of a wheel bracket or the like, and a cylindrical threaded end portion 22d for receiving a nut thereon (not shown). The portion of the ball end 22a adjacent the neck 22b is tiltable and rotatable on the interior bearing wall 21b of the bearing ring 21, and this bearing ring extends to the major diameter or great circle of the ball end 22a as shown.

A relatively rigid collar 23 composed of metal, non-squeaking plastic material, lubricant-impregnated metal, or the like is provided to receive the free end of the ball end 22a. This collar 23 is in the form of a fragmental spherical shell and converges from the great circle of the ball end 22a to a reduced-diameter opening accommodating the tip end of the ball therethrough as shown. The opening 21c and this reduced opening 23a of the collar have about the same diameter. As best shown in Figure 4, the interior of the collar has grooves 23b extending from the top to the bottom thereof for accommodating passage of lubricant.

A rubber ring 24 having a cylindrical outer wall 24a sized for fitting in the bore 14, and a fragmental spherical inner wall 24b sized for receiving the collar 23 is seated in the chamber 20 against the steel ring 21. This rubber ring 24 is preferably composed of lubricant-resisting synthetic resilient plastic material. The ring seats the collar 23 and acts as a resilient mounting or backing member for the collar.

A closure disk 25 has a cylindrical periphery 25a sized for seating in the counterbore 18 together with a flat peripheral top face 25b surrounding a central recess or depressed portion 25c. The closure plate 25 is seated in the counterbore 18 to bottom its top face 25b against the second shoulder 19 in the chamber. When so bottomed in the counterbore, the closure plate top face 25b compressively loads the rubber ring 24 to deform a portion of the ring into depressed well portion 25c as best shown in Figure 2. A portion of the housing is then spun under the closure plate 25 as at 26 to lock the plate in the housing.

Lubricant fitting 27 is threaded into the central portion of the closure plug 25 to supply lubricant to the well or space provided by the recess 25c. This lubricant is then in full communication with the ball end 22a of the stud and can readily flow through the lubricant grooves 23b in the collar 23 into the steel ring 21. As a result, the ball end of the stud and its bearing surfaces are readily lubricated.

It is a feature of this invention to provide a backing member for the bearing collar 23 which has a high form factor. The term "form factor" may be defined as the ratio of the loaded surfaces of a rubber block to the total surface.

Since in the present invention, only a small portion of the rubber ring 24 adjacent the recess 25c is unconfined, the ratio of the loaded surfaces to the total surfaces is high. Thus the backing member has a high form factor.

The compressive loading of the rubber ring 24 and the confining of this ring except for that small portion which is in communication with the recess 25c as shown in Figure 2 serves to provide a high form factor for the rubber accommodating some further deformation but effectively resiliently resisting further deformation to provide a spring-like action on the collar 23 and through the collar on the ball end 22a. The collar is thus resiliently urged toward the great diameter of the ball end 22a and the ball end, in turn, is urged into the converging end of the inner wall 21b of the bearing ring 21. This action insures the taking up of wear as the joint is used, and prevents looseness from developing between the parts.

The joint of this invention is easily assembled as shown in Figure 3 by first inserting the steel ring 21 into position in the chamber 20, by next dropping the stud shank through the bearing ring and aperture of the housing to seat the ball end 22a on the bearing wall 21b of the ring, and by inserting the collar 23 over the projecting portion of the ball end. It should be noted that this collar is bottomed on the steel ring 21 and therefore cannot tilt or cock. The rubber ring is then inserted in the chamber around the collar 23, and the closure plug is next spun into position. If desired, the collar 23 can be vulcanized or otherwise bonded to the rubber ring 24.

From the above descriptions it will be understood that the invention affords an inexpensive ball and socket type joint free from springs and still having wear take-up properties.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A ball and socket joint comprising a housing having a cylindrical chamber with an apertured end wall at one end providing a first shoulder and a counterbore at the other end providing a second shoulder, a mounting stem projecting from said housing, a hard steel bearing ring in said chamber bottomed on said first shoulder, said ring having an inner wall of fragmental spherical contour converging to an opening aligned with the aperture in said end wall, a ball stud having a shank projecting freely through said opening and aperture together with a ball end partially encased by said bearing ring in bearing engagement with the interior wall thereof, a relatively rigid fragmental spherical collar bottomed on the bearing ring and receiving the free end of the ball end therein, a rubber ring in said chamber in nesting relation with said collar, and a closure plug in said counterbore bottomed on the second shoulder, said housing being deformed under the peripheral margin of the closure plug to secure the plug in the housing, said plug having a central recessed portion and a peripheral face portion thrusting against said rubber ring to compressively load the ring and partially flow it into the recessed portion thereof whereby said loaded rubber ring will resiliently maintain the bearing parts in good bearing relation.

2. A ball and socket type joint comprising a casing, a hard metal bearing seat in said casing, a ball stud having a ball end tiltable and rotatable in said seat, a fragmental spherical bearing collar receiving a portion of said ball end of the stud, a rubber ring surrounding said collar, and closure means for housing loading said rubber ring against the collar and bearing ring for maintaining the parts in good bearing relationship.

3. A joint construction comprising an apertured casing, a stud having a head in said casing and a shank projecting freely through the aperture in said casing, a rigid bearing member embracing a portion of the stud head in said casing, a second bearing member embracing another portion of the stud head in said casing, a rubber bushing surrounding said second bearing member in said casing, a closure plug for said casing compressively loading said rubber bushing, and said closure plug having a recess into which a relatively small portion of the rubber bushing is deformed when compressively loaded, whereby said rubber bushing will have a high form factor but will function to resiliently maintain the parts in good bearing engagement.

4. A ball and socket joint comprising a housing having an end wall with an aperture therethrough, a hard steel bearing ring seated in said housing against said end wall, said bearing ring having an internal bearing wall converging toward the aperture through said end wall, a ball stud having a shank projecting through said aperture, a ball end on said ball stud tiltable and rotatable on said internal bearing wall of said bearing ring, a plastic fragmental spherical collar bottomed on said bearing ring and receiving a portion of the ball end of the stud therein, a rubber bushing surrounding said collar in said housing, and a closure plug secured in said housing against said rubber bushing to compressively load said rubber bushing, whereby said rubber bushing will urge the plastic collar toward the great circle of said ball end and thereby urge the ball end toward the convergent end of the bearing wall of said bearing ring to maintain the joint parts in good bearing relationship.

5. A ball and socket joint comprising a housing having an apertured end wall, a hardened metal bearing ring in said housing adjacent said end wall and defining a fragmental spherical ball seat, a ball stud having a shank extending freely through said bearing ring and apertured end wall and a head tiltable and rotatable on said seat, an open-ended fragmental spherical collar seated on the portion of the ball end of the stud projecting from said seat, a rubber backing member surrounding said collar in snug engagement in said housing, a closure plug anchored in said housing in thrusting engagement with the rubber backing member, said closure plug having a central recess and said closure plug deforming a portion of the rubber backing member into said recess, and a lubricant fitting on said closure plug communicating with said recess to supply lubricant to the recess and thence to the ball stud.

6. A ball and socket joint comprising a casing having an aperture in one wall, a stud having a ball end in said casing and a shank projecting freely through the aperture in said casing, a rigid bearing member embracing a portion of the ball end in said casing, a resilient ring member embracing another portion of said ball end, and means for compressively loading said resilient member, said loaded resilient member maintaining a pressure on said ball end to urge said end against said rigid bearing member to maintain the bearing relationship between the ball end and the rigid bearing member.

JAMES H. BOOTH.

REFERENCES CITED

The following references are of record in the file of this patent:

UNITED STATES PATENTS

| Number | Name | Date |
| --- | --- | --- |
| 2,048,803 | Marles | July 28, 1936 |
| 2,383,378 | Flumerfelt | Aug. 21, 1945 |
| 2,417,160 | Graham | Mar. 11, 1947 |
| 2,424,431 | Booth | July 22, 1947 |
| 2,471,672 | Booth | May 31, 1949 |